UNITED STATES PATENT OFFICE.

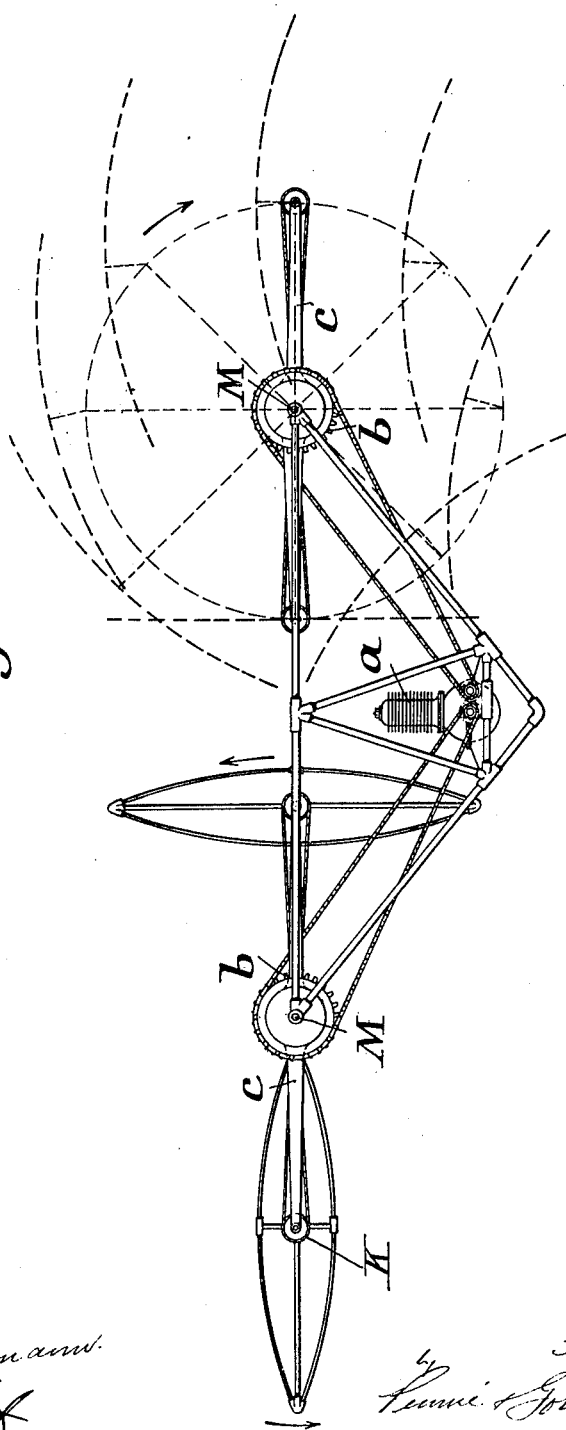

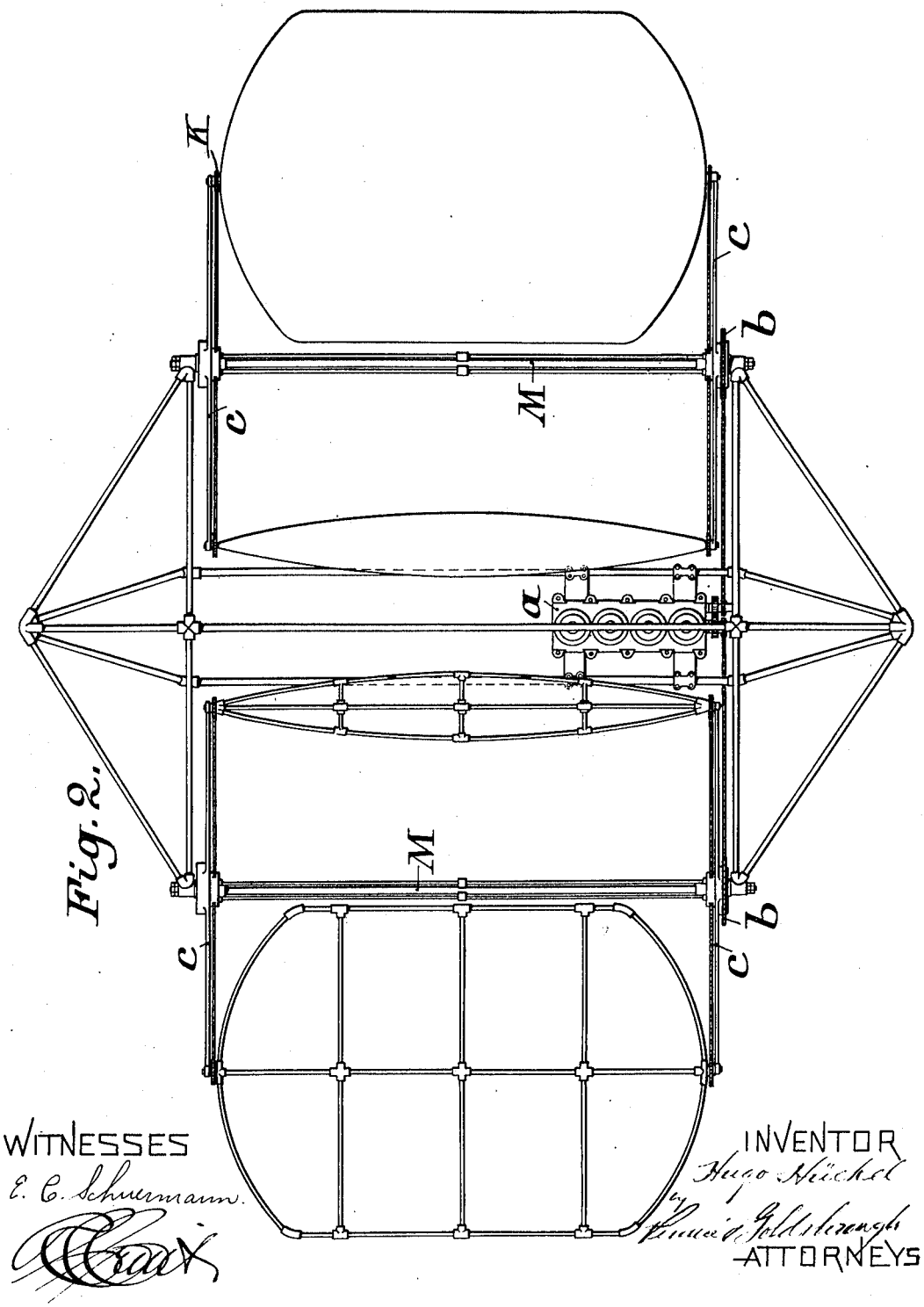

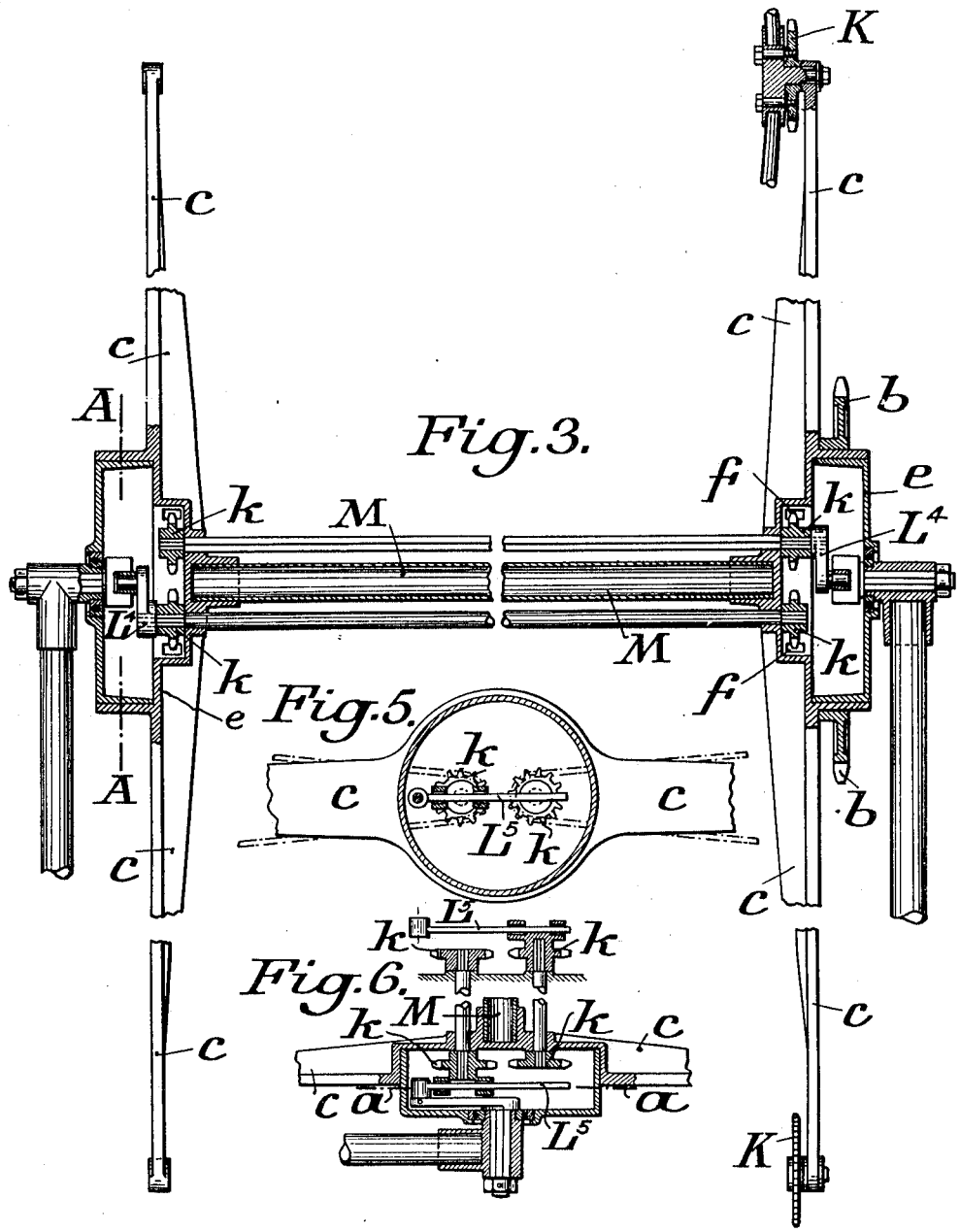

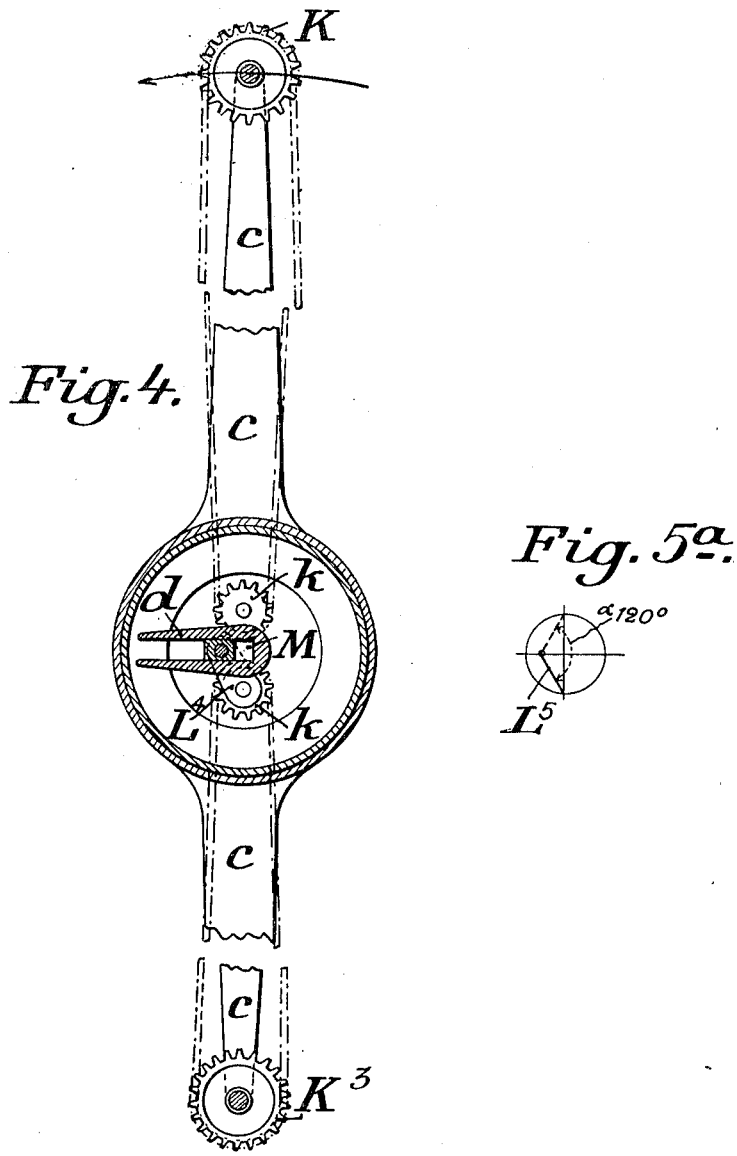

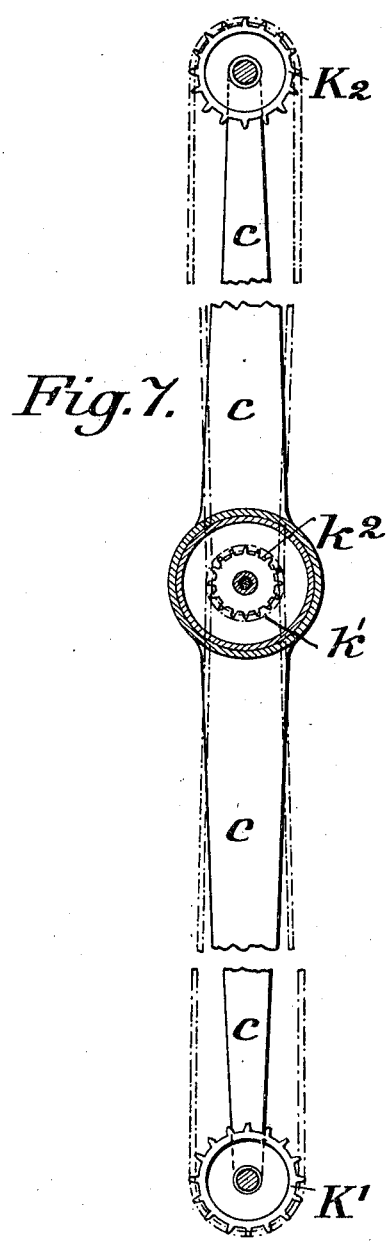
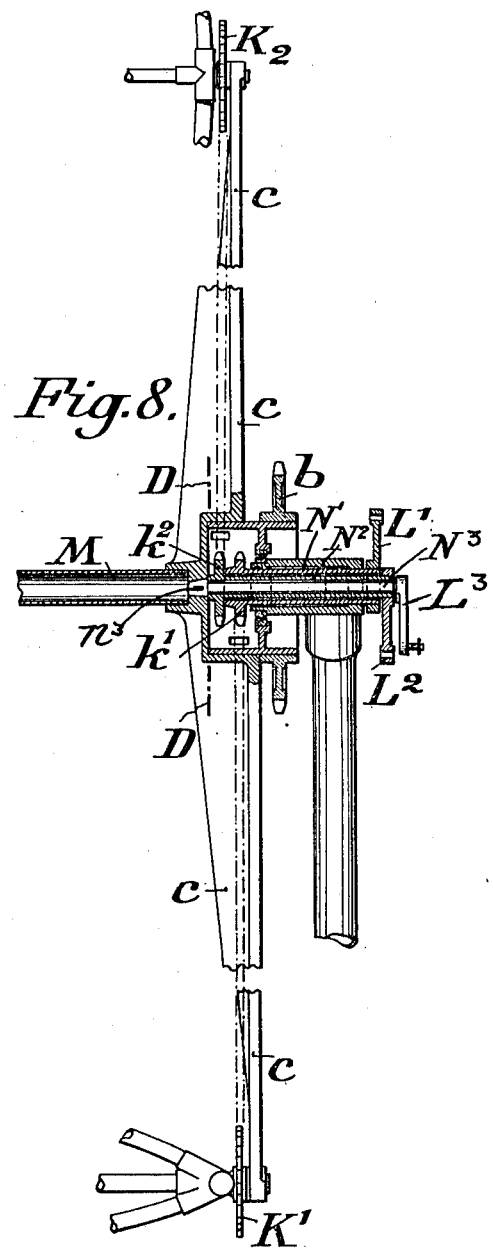

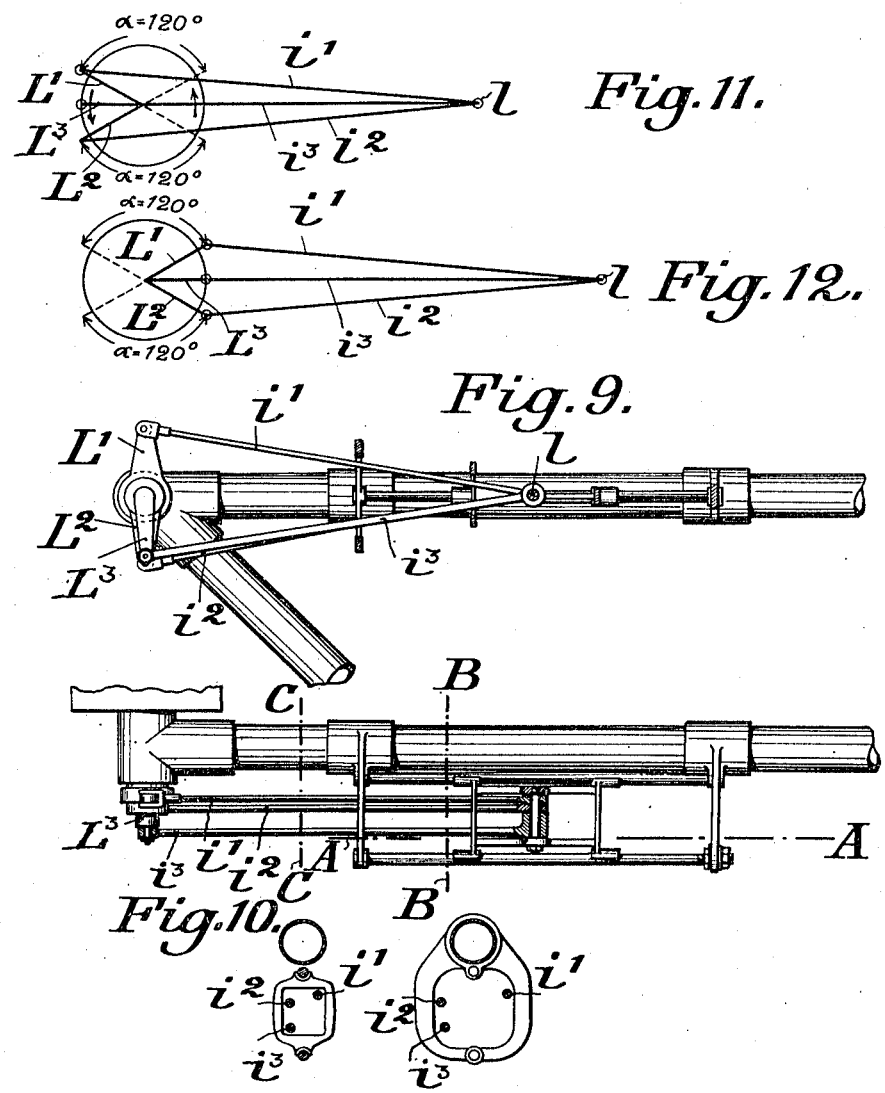

HUGO HÜCKEL, OF NEUTITSCHEIN, AUSTRIA-HUNGARY.

BLADE-FEATHERING MECHANISM FOR PROPELLERS AND THE LIKE.

974,490.　　　　Specification of Letters Patent.　　Patented Nov. 1, 1910.

Application filed February 21, 1908. Serial No. 417,063.

*To all whom it may concern:*

Be it known that I, HUGO HÜCKEL, engineer, a subject of the Austro-Hungarian Emperor, residing at 36 Landstrasse, Neutitschein, Austria-Hungary, have invented certain new and useful Improvements in Blade-Feathering Mechanism for Propellers and the Like; and I do hereby declare the following to be a full, clear, and exact description of the invention, such as will enable others skilled in the art to which it appertains to make and use the same.

This invention relates to a device with rotating blades which can be used as a propeller, a fan or a motor and wherein two similar and symmetrically arranged blades rotate with the same velocity but in opposite directions in such a manner that during the operative half of the circular motion the blades are substantially at right angles to the direction of motion of the liquid or gas, while during the other half they remain substantially tangential to the circle of motion and so offer the least resistance.

According to the present invention the blades are controlled by means of a chain wheel mounted on the axis of the blade and rotating with it, which wheel is connected by a chain with a second chain wheel arranged near the shaft around which the blades revolve and connected with the shaft by a crank or similar device. This arrangement is simpler than the planetary gearing and allows of a greater exactness of the tangential or radial position of the blade. Moreover the blades can be arranged in pairs around each shaft, the centrifugal force thus being increased.

In the accompanying drawing, in which the same reference characters denote the same parts throughout the views, Figure 1 is a front elevation of a device constructed in accordance with the invention, the different positions of one of the blades being indicated in dotted lines, Fig. 2 is a top plan view of the device, Fig. 3 is a longitudinal section through one of the shafts about which the blades rotate, showing the mechanism connecting the blades with said shaft in order to feather the former, Fig. 4 is a transverse section through the main shaft on the line A—A of Fig. 3, Fig. 5 is a view similar to Fig. 4 but showing a modified arrangement, Fig. 5$^a$ is a diagrammatic view showing the operation of the device, Fig. 6 is a detail horizontal section through the parts shown in Fig. 5, Figs. 7 and 8 are sectional views of a still further modified form of the device, Fig. 7 being taken on line D—D of Fig. 8, and Fig. 8 being a longitudinal section through the main shaft, Fig. 9 is a section of the device shown in Figs. 7 and 8 taken on the line A—A of Fig. 10, Fig. 10 is a top plan view of Fig. 9, also showing sections of the device taken on the lines B—B, C—C of said plan view, and Figs. 11 and 12 are diagrams showing the operation of this last form of the mechanism.

The chain wheels $b$ fixed to the shafts M on each side of the frame are driven by the motor $a$ thus causing the frames $c$ which are also fixed to these shafts to rotate. The blades are journaled in the frame $c$ in the manner shown in Fig. 3. To each blade is fixed a chain-wheel K in gear with a corresponding chain wheel $k$ on the shaft M. The ratio of these two chain wheels is preferably $1:2$, the wheel K being the larger. On each chain wheel $k$ is a crank $L^4$ which, as seen in Fig. 4 is guided at one end in a slot $d$ in the framework. Instead of using cranks $L^4$, cranks $L^5$ journaled in the frame and guided in a slide mounted on the chain wheel $k$ may be used, as shown in Figs. 5 and 6. The center of the small chain wheel $k$ is as near as possible to the axis of the shaft M, so that the crank can be very short. On this account it is possible to inclose the crank together with the chain wheel in a casing $e$, constituting the end of shaft M and having openings $f$ for the passage of the chain connecting the chain-wheels K, $k$. Thus it is possible to extend the shaft from one end to the other and to require gearing at one end only, (Fig. 3).

Fig. 5$^a$ is a diagram showing the angular oscillation of the crank, which is 120°. The full line in the circle is the lowest position of the crank and the dotted line the highest position.

The oscillation of the chain wheel $k$, which in Figs. 1–6 is not exactly co-axial with the shaft M, can also be effected by avoiding the circular motion resulting from this eccentric position by mounting the chain wheel co-axially with shaft M. Such a construction is shown in Figs. 7 and 8, wherein the crank $L^1$ is connected with the chain wheel $k^1$ which is in gear with the chain wheel $K^1$, while the crank $L^2$ is connected with the chain wheel $k^2$ which drives the wheel $K^2$. The cranks are moved in the manner shown in Figs. 9 and 10, a crank $L^3$ being connected with the shaft M and controlling the cranks $L^1$ and $L^2$ by the aid of rods $i^1$, $i^2$ and $i^3$ through the cross head $l$ guided in a straight guide. Figs. 11 and 12 show the cross-head and cranks at the two ends of the stroke of the crank $L^3$.

The crank $L^1$ is fixed to a sleeve $N^1$ (Fig. 8) and this sleeve has keyed to its inner end the gear $k^1$. The crank $L^2$ is fixed to the sleeve $N^2$ located within the sleeve $N^1$ and carrying at its inner end the gear $k^2$. The crank $L^3$, which is the operating crank, is carried by a spindle $N^3$, keyed at its inner end, as shown at $n^3$, to the blade-carrying frame in order to rotate the same. The crank $L^3$, which is fixed to the frame, rotates with it and actuates by means of the rod $i^3$, the cross-head $l$, and this in turn actuates the rods $i^1$ and $i^2$. These rods $i^1$ and $i^2$ transmit to the cranks $L^1$ and $L^2$ a movement of oscillation by means of which the blades are feathered.

I claim:—

1. In mechanism such as described, the combination of a revolving frame having a shaft, a blade journaled in the outer portion of the frame and carrying a gear, a driving gear carried by the frame, a chain connecting said gears, and an operative connection between the shaft and the driving gear embodying a crank driven by the rotation of the shaft.

2. In mechanism such as described, the combination of a revolving frame having a shaft, a blade journaled in the outer portion of the frame and carrying a gear, a driving gear, a chain connecting said gear with the gear on the blade, a crank to rotate said driving gear, and means connecting said crank with the shaft whereby the rotation of the latter causes the proper movement of the crank to feather the blade as the frame revolves.

In testimony whereof I have affixed my signature, in presence of two witnesses.

HUGO HÜCKEL.

Witnesses:
ROBERT W. HEINGARTNER,
AUGUST FUGGER.